F. ALLEN.
MACHINE FOR MAKING BRICKS.

No. 20,612.

Patented June 22, 1858.

UNITED STATES PATENT OFFICE.

F. ALLEN, OF BOSTON, MASSACHUSETTS.

BRICK-MACHINE.

Specification of Letters Patent No. 20,612, dated June 22, 1858.

*To all whom it may concern:*

Be it known that I, FRANCIS ALLEN, of Boston, in the county of Suffolk and State of Massachusetts, have invented an Improved Machine for Making Bricks; and I do hereby declare that the same is fully described and represented in the following specification and the accompanying drawings, of which—

Figure 3:
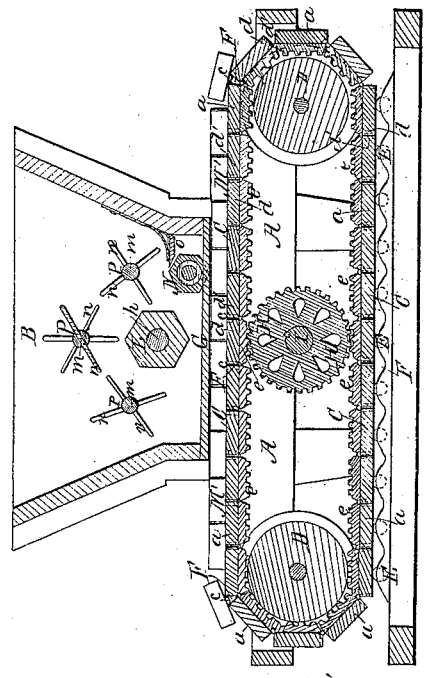
Figure 1:
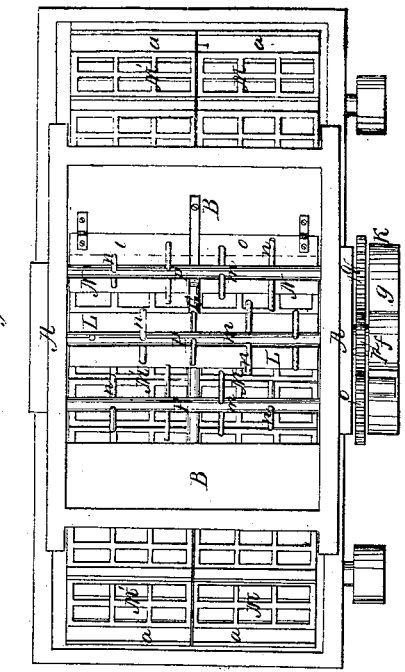
Figure 2:
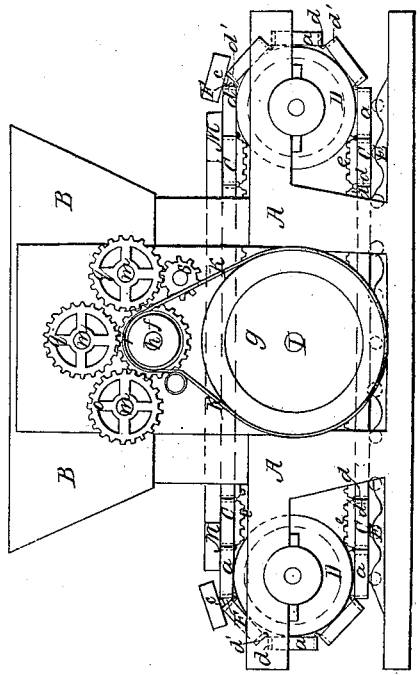

Figure 1, is a top view. Fig. 2, a side elevation. Fig. 3, a vertical and longitudinal section, and, Fig. 4, a transverse section of it.

In such drawings, A, denotes the frame of the machine as supporting a hopper B, and the operative parts to be hereinafter described.

Directly underneath the hopper is an endless mold carrier, C, constructed of a series of sections or boards $a, a, a$, hinged together and supported by two drums D, D, and sets of friction rollers, E, E, E, the whole being arranged as shown in the drawings. Each of the sections is to be made of a length sufficient to give support to two molds, when placed on it in the manner shown at M, M', in Figs. 1, and 4, such molds being placed end to end, and each having a projection $c$, to enter a cavity or space, F, formed by recesses $d, d'$ made in two contiguous sections, $a, a$, and as shown in the drawings.

Figure 4:
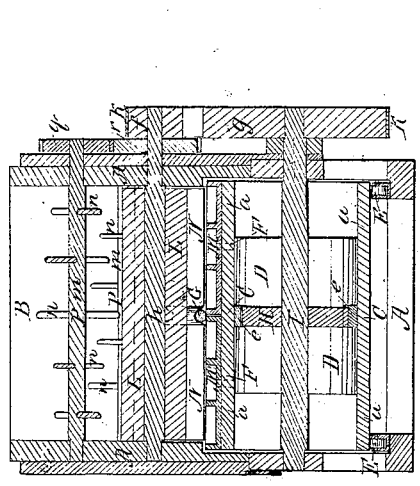

The lower part or delivery opening of the hopper is furnished with a straight bar or mold joint coverer, G, which, while the molds are passing underneath the hopper covers the joint between their two abutting ends and prevents it from becoming filled with clay. Furthermore, the lower surface of each section, $a$, is furnished with a short cogged rack, $e$, arranged in its middle and transversely of the section, and the racks forming, as it were, a continuous rack to engage with a gear, H, which, at top and bottom is made to work into the rack as shown in Fig. 4. This gear is fixed on a transverse shaft, I, which is driven by an endless band K, that works around two pulleys, $f, g$. The latter of these pulleys is fixed on the said shaft, while the former is carried by another or driving shaft $h$. In order to set the machine in operation, the shaft, $h$, is to be put in rotation by any suitable motor.

Within the hopper and on the shaft $h$, is a prismatic drum L, which I term the clay carrier and compressor, its office being to carry the clay forward and downward, and compress it, into the molds. By being polygonal instead of circular in cross section, it operates to advance the clay or move it forward out of the hopper and crowd it into the molds. Beside the prismatic drum L, there is another prismatic drum N, employed within the hopper in the position shown in Fig. 4. This drum N, is a continuous or repeating striker, its office being to "strike" the clay off the mold, and it does this while revolving and the mold is moved along under it. Placed directly over the striker, N, is a clearer or board O, which is arranged in such manner as to clear or scrape each edge of the prismatic striker during the revolution of the striker. This clearer if hinged to the hopper, and by its weight or a spring is pressed downward on the entire surface of the striker, may be caused to clear the whole of the said outer surface during each revolution of it. Besides the above, the hopper is provided with a series of rotary mixers or prongs P, P, P, each of which consists of a horizontal shaft, $m$ and a series of arms, $n, n, n, n$, extended from it. These mixers are driven or rotated by gears, $o, p, q$, which engage with a gear, $r$, carried by the driving shaft.

The prismatic clearer is rotated by a gear, $s$, which is fixed on its shaft and engages with the gear, $q$.

In the operation of the above described brick machine, the clay is pulverized or mixed by the mixers and by the action of the prismatic drums is carried downward and delivered into the molds as they pass along and underneath the hopper, such devices also being made to perform their respective functions, as hereinbefore described.

By arranging the molds immediately over and so as to cover the joints between the sections of the mold carrier, they serve to protect the joints from the clay of the hopper, or prevent them from being obstructed thereby while the machine is in action.

The driving gear of the mold carrier by being made at opposite ends of its periphery, to engage with the rack of the said carrier, acts to propel the upper portion of the carrier one way while it propels the lower portion of it in the opposite direction. Thus, each half of the mold carrier is propelled by the wheel, and of course, there will be but half of the strain of propulsion on each cog that there would be in case, the wheel acted at its top or its bottom only in the teeth of the mold carrier. Thus advantages are gained by such an arrangement.

The empty molds are placed on the top of the mold carrier and in rear of the hopper and are taken along underneath the hopper and are delivered in advance of it, when they may be removed from the carrier. The two prisms, besides operating as above set forth, assist in breaking and mixing the clay. Furthermore, in conjunction with the scraper they constitute a shield to prevent the clay from pressing too heavily upon the molds beneath them.

Having thus described my said machine, what I claim therein is as follows:

1. I do not claim the use of a single bar or striker, but I claim the combination of the prismatic striker N, and its edge clearer O, with the hopper B, and the mold carrier C when the several parts are constructed and arranged as described.

2. I also claim the application of the mold joint coverer or bar G, to the discharging passage of the hopper B and so as to cover the joint between the two abutting ends of two molds M, M', as specified.

3. I also claim the arrangement of each mold directly over a joint between two sections a, a, of the mold carrier and so as to cover and protect the said joint in combination with the projection and recess, or the equivalent thereof, applied to the mold and the carrier and to operate substantially as specified.

In testimony whereof, I have hereunto set my signature.

FRANCIS ALLEN.

Witnesses:
R. H. Eddy,
F. P. Hale, Jr.